United States Patent [19]
Barnes, Jr.

[11] 3,987,132
[45] Oct. 19, 1976

[54] FLUID FLOW REGULATION

[75] Inventor: Casper W. Barnes, Jr., Newport Beach, Calif.

[73] Assignee: Dresser Industries, Inc., Dallas, Tex.

[22] Filed: July 3, 1974

[21] Appl. No.: 485,517

[52] U.S. Cl. ............................ 261/51; 261/DIG. 67; 261/DIG. 78; 261/73; 137/9
[51] Int. Cl.² ........................................... F02M 7/20
[58] Field of Search .............. 261/DIG. 67, DIG. 78, 261/73, 51; 137/9

[56] References Cited
UNITED STATES PATENTS

| | | | |
|---|---|---|---|
| 1,010,184 | 11/1911 | Schulz | 261/DIG. 67 |
| 1,241,546 | 10/1917 | Payton | 261/DIG. 67 |
| 1,399,530 | 12/1921 | Stewart | 261/73 |
| 1,814,118 | 7/1931 | Bracke | 261/DIG. 67 |
| 2,250,932 | 7/1941 | Kittler | 261/51 |
| 2,367,499 | 1/1945 | Holley, Jr. | 261/39 A |
| 2,672,329 | 3/1954 | Zarnack | 261/DIG. 56 |
| 3,689,036 | 9/1972 | Kikuchi et al. | 261/51 |
| 3,778,038 | 12/1973 | Eversole et al. | 261/DIG. 78 |
| 3,829,069 | 8/1974 | Hailstone et al. | 261/DIG. 78 |

*Primary Examiner*—Tim R. Miles
*Attorney, Agent, or Firm*—Connolly and Hutz

[57] ABSTRACT

Flow regulating apparatus comprises a turbulent-flow valve with a fluid supply connected at the upstream side thereof. A fixed pressure bias is applied to the fluid upstream of the valve whereby the mass flow rate of fluid through the valve is directly proportional to the pressure differential across the apparatus when these variations are within a selected pressure range. Such flow regulation may be used in a system for introducing a metered amount of liquid fuel into an air stream to provide a combustible air-fuel mixture having a substantially constant air-to-fuel ratio. With this system air is passed through a constricted zone to increase its velocity to sonic, and the area of the constricted zone is varied in correlation with operating demands imposed upon the engine for which the mixture is produced. A liquid fuel supply is under the influence of atmospheric pressure, and fuel is metered from the supply into the air stream by controlling a fuel valve of the turbulent-flow type in direct proportion to the area of the constricted zone, the fuel valve being exposed to the pressure of the air stream. The fixed pressure bias is applied to the liquid fuel supply so that the mass flow rate of fuel through the valve varies in direct proportion with variations in atmospheric pressure.

10 Claims, 6 Drawing Figures

FLUID FLOW REGULATION

CROSS-REFERENCE TO RELATED APPLICATION

The present application is related to an application Ser. No. 485,518 entitled "Fluid Flow Device and Liquid Metering," filed July 3, 1974.

BACKGROUND OF THE INVENTION

The present invention relates to fluid flow regulation, and also to method and apparatus for regulating the metering or liquid fuel as atmospheric pressure changes to thereby produce an air-fuel mixture having a substantially constant air-to-fuel ratio.

U.S. Pat. No. 3,778,038, issued Dec. 11, 1973, describes a method and apparatus for producing a uniform combustible mixture of air and minute liquid fuel droplets for delivery to an internal combustion engine. The apparatus includes an intake air zone connected to a variable area constricted zone for constricting the flow of air to increase the velocity thereof to sonic. Liquid fuel is introduced into the air stream at or above the constricted zone to divide and uniformly entrain fuel as droplets in the air flowing through the constricted zone. Walls downstream of the constricted zone are arranged to provide an increasing cross-sectional area for efficiently converting a substantial portion of the kinetic energy of the high velocity air and fuel to static pressure. Through such conversion it is possible to maintain sonic velocity air flow through the constricted zone over substantially the entire operating range of the engine.

The above U.S. patent further explains the well known phenomena that under sonic conditions, the pressure of the air at the constricted zone is approximately 53% of atmospheric pressure. Under sonic conditions and when the atmospheric pressure remains constant, it is possible to provide an air-liquid fuel mixture having a substantially constant air-to-fuel ratio by simply metering the amount of fuel delivered into the air stream in direct proportion to the area of the constricted zone. However, when atmospheric pressure varies, possibly due to altitude changes, the mass flow rate of air passing through the apparatus also varies. When this occurs it is necessary to adjust the amount of fuel introduced into the air stream in order to maintain a substantially constant air-to-fuel ratio. For example, when atmospheric pressure decreases, the air passing through the device has less mass density and less fuel is required to produce a mixture having the same air-to-fuel ratio as before the atmospheric change. A fuel metering system which relies solely upon the area of the constricted zone or the volume of air passing therethrough does not correct for such atmospheric fluctuations, and the air-to-fuel ratio varies depending upon varying atmospheric conditions.

In order to accurately compensate for atmospheric pressure changes it is necessary that variations in the pressure differential across the fuel metering valve be accompanied by directly proportional variations in the mass flow rate of fuel through the valve. While laminar-flow metering valves meet such specifications, the mass flow rate of fuel through these valves is inversely dependent upon the kinematic viscosity of the liquid. For example, over a temperature range of 20° to 100° F., the kinematic viscosity of gasoline changes approximately by a factor of two which results in a system highly sensitive to fuel temperature. It is extremely difficult, if not impossible, or excessively expensive to compensate for such temperature dependence in producing a laminar-flow valve. Accordingly, even though the mass flow rate of fluid through a laminar-flow valve varies directly with the pressure differential across the valve, its inverse dependence on kinematic viscosity makes it totally unacceptable from the standpoint of corrective fuel metering for atmospheric pressure fluctuations. On the other hand, while turbulent-flow valves, such as needle valves, are not sensitive to the kinematic viscosity of liquids, the mass flow rate through such a valve does not vary directly with the pressure differential across the valve.

SUMMARY OF THE INVENTION

Accordingly, an object of the present invention is to provide fluid flow regulation apparatus and method wherein the mass flow rate of fluid through a turbulent-flow valve varies directly with variations in the pressure differential across the apparatus when such changes are within a selected pressure range.

Another object of the present invention is a simple and highly efficient method and apparatus that regulates fuel metering so that as atmospheric conditions change the air-to-fuel ratio of an air-fuel mixture remains substantially constant.

In accordance with the present invention, flow regulating apparatus comprises a turbulent-flow valve with a fluid supply connected to the upstream side of the valve. A fixed pressure bias is applied to the fluid upstream of the valve so that the mass flow rate of fluid through the valve varies directly with variations in the pressure differential across the apparatus when these variations are within a selected pressure range.

Moreover, in accordance with the present invention, method and apparatus are provided for producing a combustible air-liquid fuel mixture having a substantially constant air-to-fuel ratio over substantially the entire operating range of an engine to which the mixture is supplied. An air passageway includes a gradually converging air entrance zone, a variable area throat zone through which air and liquid fuel are passed at sonic velocity, and a gradually diverging downstream zone. A fuel supply is under the influence of atmospheric pressure, and fuel metering is provided for delivering a metered amount of fuel into the air stream flowing through the passageway at or above the throat zone. The fuel metering includes a valve exposed to the pressure of the air stream and connected to the fuel supply. A valve operator controls the rate of fuel delivered into the air stream in direct proportion to the area of the throat zone as the area of the throat zone is modulated. A fixed pressure bias is applied to the fuel supply whereby the mass flow rate through the valve varies directly with variations in atmospheric pressure to thereby adjust the liquid fuel metered in direct proportion to atmospheric pressure fluctuations so that the air-to-fuel ratio of the mixture is maintained substantially constant.

Typically, the fuel metering valve is a needle valve, and the arrangement for applying the fixed pressure bias to the liquid upstream of the valve may include a connection from the intake manifold to the fuel source of the supply with a pressure regulator in the connection. Alternatively, the fixed pressure bias may be applied to the liquid fuel at a location between the fuel source and the valve.

Brief Description of the Drawings

Novel features and advantages of the present invention in addition to those mentioned above will become apparent to those skilled in the art from a reading of the following detailed description in conjunction with the accompanying drawings wherein similar reference characters refer to similar parts and in which.

Detailed Description of the Invention

Figures 2A, 2B:
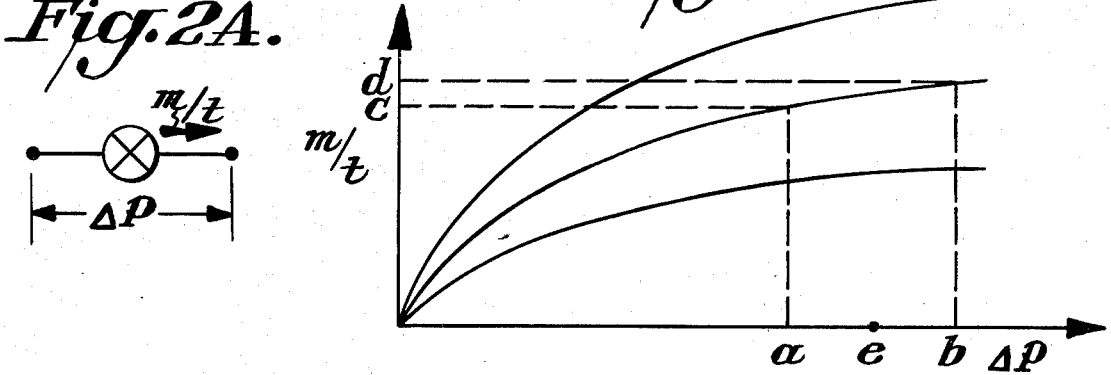
FIGS. 2A and 2B diagrammatically illustrate the flow characteristics of a typical orifice needle valve at several settings thereof.
Figures 3A, 3B:
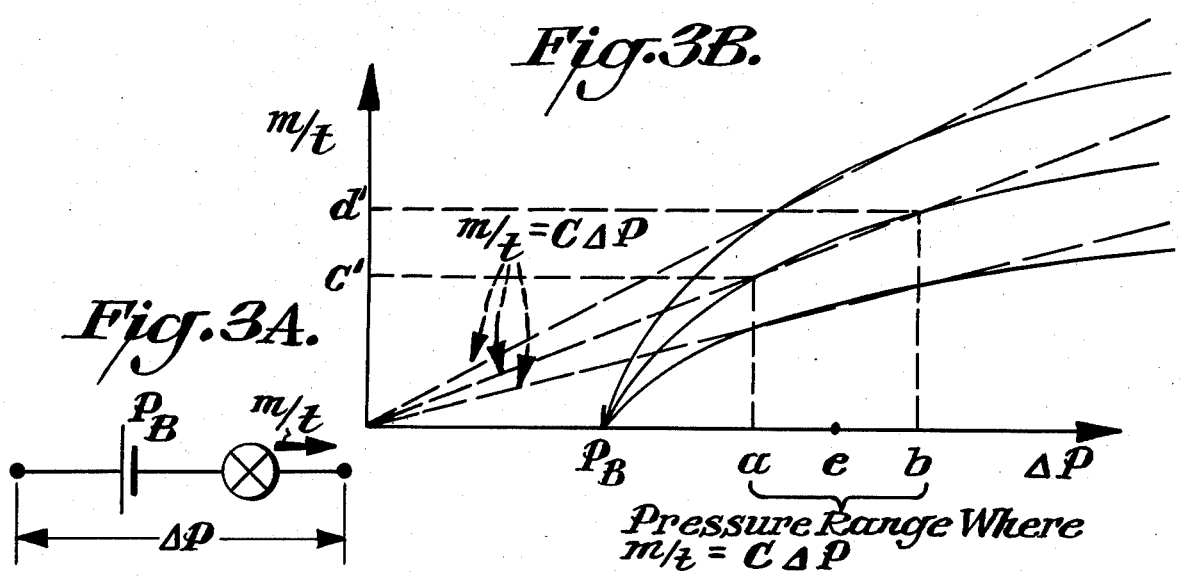
FIGS. 3A and 3B diagrammatically illustrate fluid flow regulation, according to the present invention.

Referring in more particularity to the drawings, the present invention is best understood by initially referring to FIGS. 2A and 2B. FIG. 2A shows a typical orifice needle valve, and FIG. 2B is a plot of the mass flow rate (mass per unit time) of fluid flowing through the valve versus the pressure differential across the valve for three different valve settings. Other types of turbulent-flow valves have characteristics similar to FIG. 2B with flow rate varying as a power of the pressure differential. As shown therein, the mass flow rate varies as the square root of pressure, and this valve is representative of turbulent-flow valves. The mass flow rate of fluid through the valve does not vary in direct proportion to the pressure differential across the valve, and it could not be utilized to accurately compensate fuel delivery in response to atmospheric pressure changes. However, in the present invention a fixed pressure bias is applied to the fluid upstream of the valve, and FIGS. 3A and 3B illustrate the characteristics of such an apparatus. By an appropriate choice of pressure bias, one can approximate a desired direct proportion relation between the mass flow rate of fluid passing through the valve and the pressure differential across the apparatus in a selected pressure range, and this relationship is shown in FIG. 3B as $m/t = c\Delta P$. Hence, over a selected pressure range the mass flow rate of the fluid varies directly with the pressure differential across the apparatus, as shown. In other words, regardless of the valve setting, when the pressure differential across the apparatus changes, the mass flow rate of fluid is adjusted in direct proportion to such changes. Once the varying pressure differential across the apparatus is determined, a fixed pressure bias is applied to the fluid entering the valve which provides a direct relationship between mass flow rate and pressure in the determined pressure range.

While it is stated that the mass flow rate of fluid passing through the valve varies in direct proportion to the pressure differential across the apparatus of FIG. 3A, it should be noted that since the flow rate variations follow the curves of FIG. 3B, the direct relationship is only approximate. However, for all practical purposes, since the portions of the curves of FIG. 3B for the predetermined pressure range are substantially linear along lines passing through origin of the plot, the relationship between mass flow rate and pressure differential may be referred to as a direct proportion.

When the pressure differential across the valve of FIG. 2A varies between point $a$ and point $b$ for the intermediate valve setting of FIG. 2B, the mass flow rate of fluid passing through the valve varies between point $c$ and point $d$. However, the change in the mass flow rate from point $c$ to point $d$ varies as the square root of the pressure rather than directly. On the other hand, with the apparatus of FIG. 3A, when a fixed pressure bias is applied to the fluid upstream of the valve, the same variation in pressure differential across the apparatus between points $a$ and $b$ is accompanied by a directly proportional variation in the mass flow rate between points $c'$ and $d'$. Through the selection of an appropriate fixed pressure bias the valve operates in a region where variations in pressure differential are accompanied by direct variations in the mass flow rate of fluid through the valve.

Figure 1:
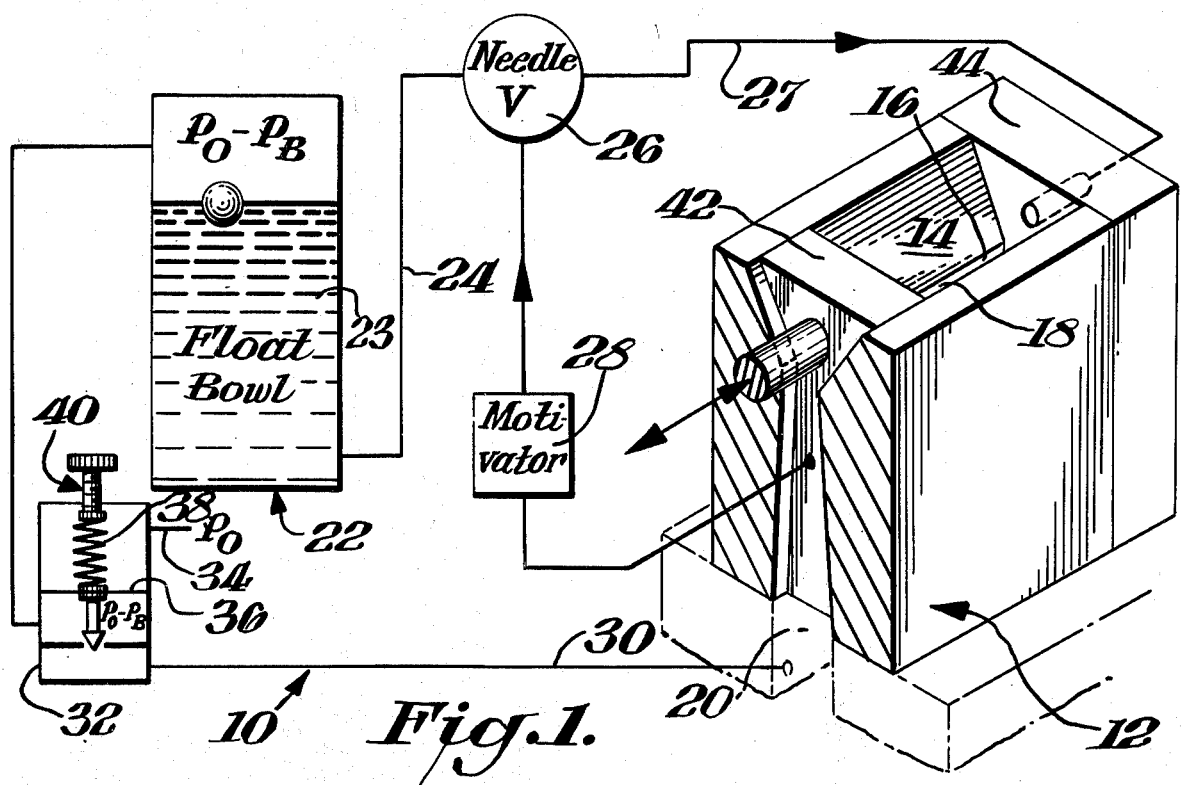
FIG. 1 is a diagrammatic view of flow regulating apparatus, according to the present invention.

FIG. 1 illustrates flow regulating apparatus 10 for delivering a metered amount of liquid fuel into an air stream. Generally, the air stream enters a mixing device 12 that includes a gradually converging air entrance 14 connected to a variable area throat or constricted zone 16. A gradually diverging downstream zone 18 is connected to the throat zone, and the downstream zone is connected to an intake manifold 20. The area of the throat 16 is varied in accordance with operating demands upon the engine to which the device 12 is attached. The air stream enters at 14 and is accelerated to sonic velocity at the throat zone 16. Also, the kinetic energy of the high velocity air is efficiently converted to static pressure as the air flows through the diverging downstream zone 18. Such efficient conversion of kinetic energy to static pressure enables sonic flow to exist at the throat zone 16 over substantially the entire range of intake manifold conditions.

The flow regulating apparatus 10 also has a liquid fuel supply 22 including a fuel source 23 under the influence of atmospheric pressure $P_o$, and as shown in FIG. 1, the fuel source may be in the form of a float bowl. The supply 22 also includes a fuel line 24 connecting the source 23 to a needle valve 26 arranged to meter fuel, as explained below. The downstream end of the valve 26 is connected to the device 12 upstream of the throat zone 16 by line 27. Alternatively, the line 27 may be connected to the device 12 at the throat zone 16, if desired. The valve 26 is opened and closed in direct proportion to the cross-sectional area of the throat zone 16, and a motivator 28 connected between the device 12 and the valve opens and closes the valve directly with respect to the cross-sectional area of the throat zone as that area is modulated in response to engine demands.

A fixed pressure bias $P_B$ is applied to the liquid fuel upstream of the valve 26. The bias causes the valve 26 to operate in a region where the mass flow rate of fuel varies directly with variations in the pressure differential between atmosphere and the pressure at the fuel introduction point in the device 12 when these variations are within a selected pressure range. Such valve operation is utilized to compensate the amount of fuel delivered in direct proportion to atmospheric pressure variations. The arrangement for applying the fixed pressure bias may include a line 30 extending from the intake manifold 20 to the fuel source 23 with a pressure regulator 32 in the line.

The pressure regulator 32 is referenced to atmospheric pressure by a vent 34, and as shown in FIG. 1, the back of the diaphragm 36 of the regulator is at atmospheric pressure. The fixed pressure bias $P_B$ may be adjusted by changing the tension on spring 38 through manipulation of the knob 40, as is well known. The regulator sets the air pressure in the float bowl 23 at $P_o-P_B$, the pressure bias $P_B$ being fixed and independent of $P_o$. Hence, when the diaphragm 36 is in equilibrium each side thereof is acted upon by atmospheric pressure minus the pressure bias provided by the upward force of the spring 38. Since the lower half of the regulator is connected to the fuel source by a portion of line 30, the pressure above the fuel in the bowl 23 is equal to pressure in the lower half of the regulator which in turn is equal to atmospheric pressure minus the pressure bias.

The air entrance zone 14 is designed so that cross-sectional area thereof varies directly with the cross-sectional area of the throat. This is accomplished by providing a pair of opposite spaced apart walls 42, 44 mounted for relative movement toward and away from one another to vary the area of the throat zone 16. The walls are flat and parallel to one another at least in the air entrance zone 14. As shown in the drawing, wall 42 moves toward and away from stationary wall 44 to modulate the area of the throat. Wall 34 may be coupled to the throttle pedal of the engine to which device 12 is attached for direct movement therewith in response to operating demands imposed upon the engine. This wall arrangement also varies the area of the air entrance zone but such variation is directly related to the area of the throat. Hence, the pressure at the point of introduction of the fuel into the air intake zone 14 bears a predictable relationship to the pressure at the throat. As noted above, under sonic conditions, the pressure at the throat 16 is always approximately 53% of atmospheric pressure. Since the area ratio of the air entrance zone 14 to the throat zone 16 is constant, the pressure at the fuel introduction point in the entrance zone 16 will always be the same percentage of atmospheric pressure, and changes in atmospheric conditions are automatically reflected in the pressure at the fuel introduction location. It is desirable that the point of introduction of fuel into the air entrance zone 14 be located so that the pressure at that point is about 29 inches Hg., when the atmospheric pressure is 30 inches Hg. This provides a desirable pressure for metering fuel into the air stream flowing through the device 12, and the pressure at the fuel introduction point will always be 29/30 of atmospheric pressure.

In operation, air enters the device 12 at atmospheric pressure, for example 30 inches Hg., and is accelerated to sonic velocity at the throat 16 by the action of the engine which functions as a downstream pump. The amount of air flowing through the device is governed by the location of the movable wall 42 which may be connected for movement with the throttle pedal. As the throat area is increased, for example, the motivator 28 directly increases the opening of the needle valve 26 which allows additional fuel to enter into the increased air stream. The differential between the pressure acting upon the fuel source 23 ($P_o-P_B$) and the pressure at the point of introduction of the fuel into the device 12 (about 29 inches Hg.) causes fuel to flow through the valve 26. With a fixed pressure bias $P_B$ of 0.5 inch Hg., the pressure of the fuel upstream of the valve is $P_o-P_B$ or 29.5 inches Hg. and the downstream pressure is 29.0 inches Hg. The pressure differential across the valve is 0.5 inch Hg. Any change in atmospheric pressure is accompanied by a direct change in pressure at the point of introduction of the fuel into the device 12, as explained above. This results in a change in the pressure differential across the needle valve and an adjustment of the fuel flowing through the line 27 into the device 12. For example, if the atmospheric pressure drops to 24.0 inches Hg., the pressure of the fuel upstream of the valve ($P_o-P_B$) becomes 24.0 inches Hg.—0.5 inch Hg. or 23.5 inches Hg. The downstream pressure being 29/30 $P_o$ drops to 23.2 inches Hg., and the pressure differential across the valve is 23.5 inches Hg.—23.2 inches Hg. or 0.3 inch Hg. With the fixed pressure bias $P_B$ applied to the liquid upstream from the needle valve 26, the change in pressure differential across the valve from 0.5 inch Hg. to 0.3 inch Hg. is accompanied by a direct change of the mass flow rate of fuel through the valve which properly compensates the fuel metering for the decrease in atmospheric pressure. In other words, the mass flow rate of liquid through the valve varies directly with variations in the pressure differential across the valve so that the air-to-fuel ratio of the mixture produced remains constant.

FIGS. 2B and 3B graphically illustrate the results of the applied fixed pressure bias of the present invention. Utilizing the same representative examples expressed above, the pressure differential across the valve of FIG. 2A becomes 30 inches Hg.—29.0 inches Hg. or 1.0 inches Hg., and this pressure differential is shown in FIG. 2B as point $e$. When the atmospheric pressure drops to 24.0 inches Hg., the pressure differential across the valve of FIG. 2A drops to 0.8 inch Hg. (24 inches Hg.—29/30 24 inches Hg.), and the pressure variation from 1.0 inch Hg. to 0.8 inch Hg. is accompanied by a drop in the mass flow rate of the fuel which is not directly proportional thereto. On the other hand, when a fixed pressure bias $P_B$ of 0.5 inch Hg. is applied to the fuel upstream from the valve, a change in pressure differential from 1.0 inch Hg. to 0.8 inch Hg. between the atmospheric pressure and the pressure at the fuel introduction points is accompanied by a directly proportional change in the mass flow rate of fuel through the valve. Point $e$ in FIG. 3B represents a pressure differential of 1.0 inch Hg. between the atmosphere and the fuel introduction point, and as clearly shown, a slight change in this differential in either direction is accompanied by a directly proportional change in the mass flow rate of fuel due to the applied fixed pressure bias $P_B$.

Another important aspect of the present invention is that the pressure bias $P_B$ is independent of the valve parameters of the needle valve 26 and is therefore substantially independent of the valve setting. Hence, fluid flow regulation for all settings of the valve is obtained with a single fixed pressure bias. Also, the fixed pressure bias $P_B$ may be applied between the fuel source 23 and the valve 26 rather than upstream from the source, if desired.

Figure 4:
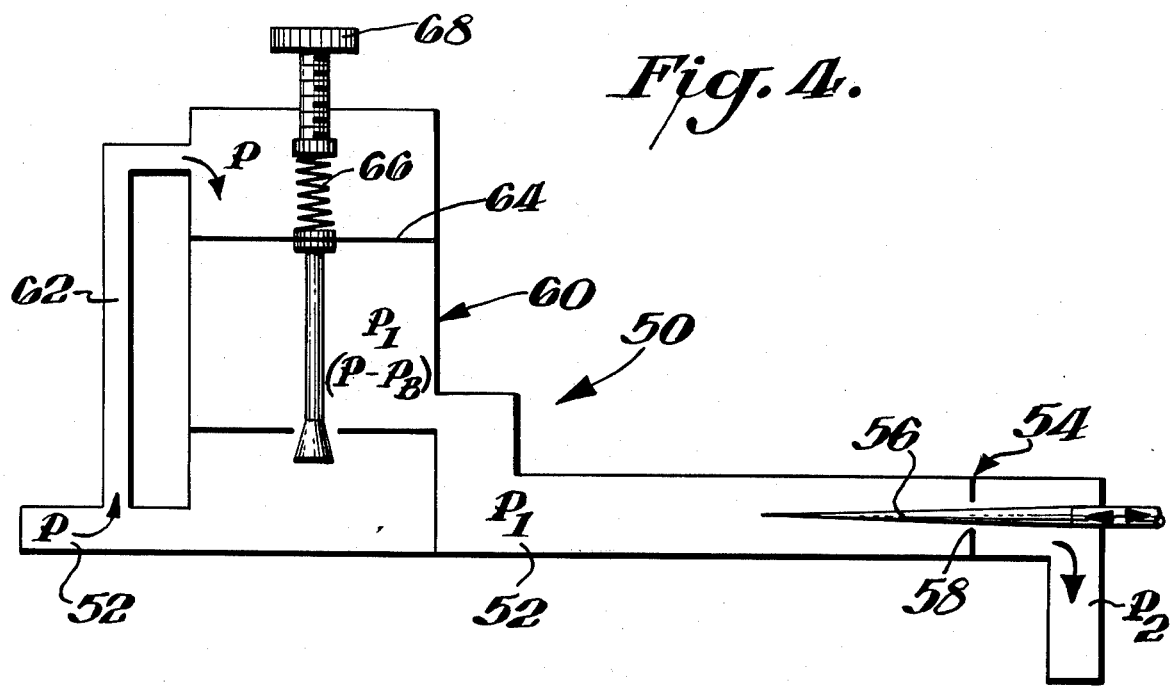
FIG. 4 is a diagrammatic view of another flow regulating apparatus, according to the present invention.

FIG. 4 illustrates another fluid flow apparatus 50, according to the present invention. Fluid flows through an appropriate conduit 52 from an upstream source (not shown) to a turbulent-flow valve 54 in the form of a needle valve. As is well known, shifting movement of the needle 56 relative to the orifice 58 changes the free cross-sectional area of the valve to thereby change the fluid flow rate. Immediately upstream from the valve 54 a pressure regulator 60 is positioned in the line 52. The pressure regulator is referenced to the upstream pressure $P$ of the fluid flowing to the regulator by a line 62 connecting the upstream fluid to the back of the diaphragm 64.

The pressure regulator 60 functions to apply a fixed pressure bias $P_B$ to the fluid upstream of the needle valve 54. As explained above, the application of a fixed pressure bias enables the mass flow rate of fluid passing through the valve 54 to vary directly with variations in pressure differential $P-P_2$ when these changes are within a selected pressure range. The fixed pressure bias may be adjusted to a desired value by changing the tension on spring 66 through manipulation of the operator knob 68. Once the operating range of pressure drop across the valve 52 is determined, an appropriate fixed pressure bias $P_B$ is selected to provide a direct proportional relationship between pressure differential and mass flow rate within the operating range.

What is claimed is:

1. A method for producing a combustible air-liquid fuel mixture having a substantially constant air-to-fuel ratio comprising the steps of passing air through a constricted zone to increase its velocity to sonic, varying the area of the constricted zone in correlation with operating demands imposed upon the engine for which the mixture is produced, placing a liquid fuel supply under the influence of atmospheric pressure, metering fuel from the supply into the air stream at or above the constricted zone by controlling a fuel valve in direct proportion to the area of the constricted zone, exposing the fuel valve to the pressure of the air stream at the point of introduction of fuel, and applying a fixed pressure bias to the fuel supply whereby the mass flow rate of fuel through the valve varies in direct proportion to variations in atmospheric pressure to adjust the liquid fuel metered in direct proportion to atmospheric pressure fluctuations so that the air-to-fuel ratio of the mixture is maintained substantially constant.

2. A method as in claim 1 wherein the step of applying the fixed pressure bias to the fuel supply includes regulating pressure from the intake manifold to the fuel supply means.

3. A method as in claim 1 wherein the fixed pressure bias is applied to the fuel supply at a location between a source of liquid fuel under atmospheric pressure and the fuel valve.

4. A device for producing a combustible air-liquid fuel mixture having a substantially constant air-to-fuel ratio over substantially the entire operating range of an engine to which the mixture is supplied comprising wall means defining a passageway including a gradually converging air entrance zone, a variable area throat zone through which air and liquid fuel are passed at sonic velocity, and a gradually diverging downstream zone, liquid fuel supply means under the influence of atmospheric pressure, and fuel metering means for delivering a metered amount of fuel into an air stream flowing through the passageway at or above the throat zone including valve means exposed to the pressure of the air stream and connected to the liquid fuel supply means, valve operator means for controlling the rate of fuel delivered into the air stream in direct proportion to the area of the throat zone, and flow regulating means applying a fixed pressure bias to the fuel supply means whereby the mass flow rate through the valve means varies in direct proportion to variations in atmospheric pressure to adjust the liquid fuel metered in direct proportion to atmospheric pressure fluctuations whereby the air-to-fuel ratio of the mixture is maintained substantially constant.

5. A device as in claim 4 including an intake manifold downstream from the gradually diverging downstream zone, and wherein the flow regulating means applying a fixed pressure bias to the fuel supply means includes a line from the intake manifold to the fuel supply means and a pressure regulator in the line referenced to the atmosphere.

6. A device as in claim 4 wherein the flow regulating means comprises a pressure regulator located between the fuel supply means and the valve means arranged to maintain the pressure differential across the regulator fixed.

7. A flow regulating system for delivering a metered amount of liquid into an air stream comprising a duct through which an air stream is passed, liquid supply means under the influence of atmospheric pressure, valve means exposed to the pressure of the air stream and connected to meter liquid from the supply means into the air stream, valve operator means for manipulating the valve means in direct proportion to the volume of air flowing through the duct, and flow regulating means applying a fixed pressure bias to the liquid supply means so that the pressure on the fuel immediately upstream from the valve means is solely under the influence of atmospheric pressure and the pressure bias, and wherein said fixed pressure bias is of such a magnitude that the mass flow rate through the valve means varies in direct proportion to variations in atmospheric pressure to thereby adjust the metered liquid delivered in direct proportion to atmospheric pressure fluctuations.

8. A flow regulating system as in claim 7 wherein the valve means is a needle valve.

9. A flow regulating system as in claim 7 wherein the liquid supply means includes a source of fuel and the air duct includes a gradually converging air entrance zone, a variable area throat zone, and a gradually diverging downstream zone connected to an intake manifold.

10. A flow regulating system as in claim 9 wherein the means applying the fixed pressure bias to the liquid supply means includes a connection from the intake manifold to the source of fuel and a pressure regulator in the connection referenced to the atmosphere.

* * * * *